Aug. 14, 1928.
H. BAMBERGER
SINK CLEANER
Filed June 17, 1927
1,681,082
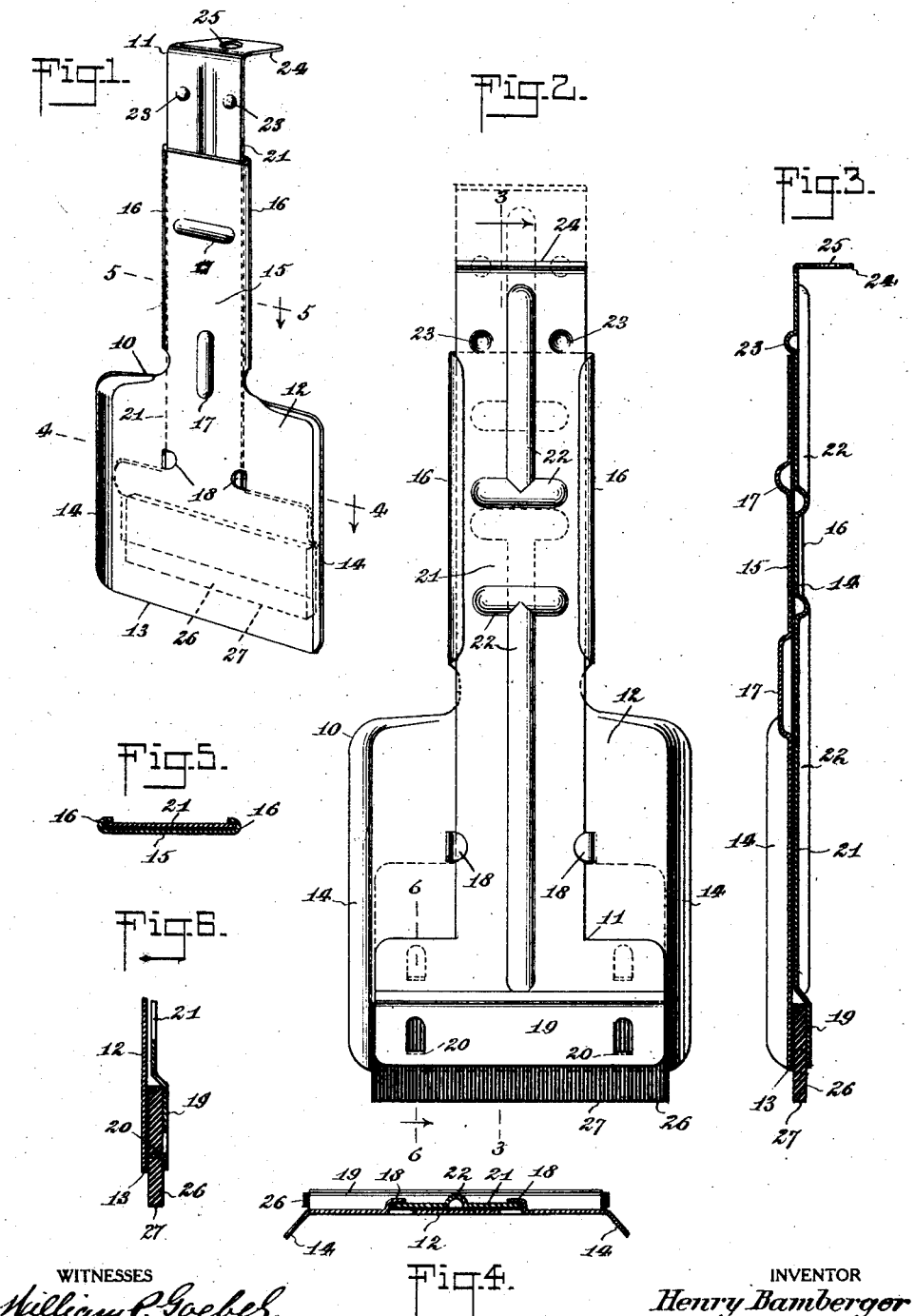
WITNESSES
William P. Goebel
Chris Feinle.
INVENTOR
Henry Bamberger
BY Munn & Co.
ATTORNEYS Patented Aug. 14, 1928.

1,681,082

UNITED STATES PATENT OFFICE.

HENRY BAMBERGER, OF BROOKLYN, NEW YORK.

SINK CLEANER.

Application filed June 17, 1927. Serial No. 199,561.

This invention relates to a cleaning device particularly adapted for cleaning a sink.

The principal object of the invention is the provision of a device of dual character, in that it may be used optionally for cleaning or scraping the walls of a sink to gather waste matter therein, and as a shovel for removing the waste matter from the sink.

Another object of the present invention is to provide a device of the indicated character which is cheap, practical and effectual.

The nature of the invention and its distinguishing features and advantages will appear when the following specification is read in conjunction with the accompanying drawing, in which—

Figure 1 is a perspective view of a device embodying the features of the present invention.

Figure 2 is an elevation looking toward the scraper element of the device; the scraper being shown with its effective edge disposed in an effectual position for use.

Figure 3 is a sectional view taken on the line 3—3 of Figure 2.

Figure 4 is a sectional view taken on the line 4—4 of Figure 1.

Figure 5 is a sectional view taken on the line 5—5 of Figure 1.

Figure 6 is a sectional view taken on the line 6—6 of Figure 2.

The device of the present invention comprises two elements, a shovel element 10 and a scraper element 11. These elements 10 and 11 are associated with each other so as to be used optionally for carrying out scraping and shoveling operations. The device is therefore especially useful for cleaning a sink.

The shovel element 10 is stamped, bent and formed from a single piece of material, preferably metal, to provide a shovel body 12 having an effective edge 13 and side flanges 14; a handle section 15 having channels 16 respectively at the opposite side edges; reinforcing ribs or ridges 17 on the handle section; and tongues 18 which occur on the shovel body 12 and which are adapted to co-act with the channels 16 for a purpose to appear.

The scraper element 10 includes a part stamped, bent and formed from a single piece of material, preferably metal, to provide an offset end portion 19 having prongs 20; a handle section 21 having reinforcing ribs or ridges 22; stops 23; and a manipulating portion 24 having a hole 25. The scraper element 11 also includes a part which provides the effective edge of the scraper and consists preferably of a piece of rubber 26. The piece of rubber 26 is arranged on the offset portion 19 and is held in place by the prongs 20 which impale the piece of rubber, and a portion of the shovel body 12 which co-acts with the end portion 19 and the prongs 20.

The shovel element 10 and scraper element 11 are associated with each other by virtue of the channels 16 on the handle section 15, and the tongues 18 on the shovel body 12. The said channels 16 and tongues 18 respectively engage the opposite side edges of the handle section 21 of the scraper element 11 and thus hold the shovel element 10 and scraper element 11 together for adjustment with respect to each other. The shovel element 10 and scraper element 11 will be slidable, and this will permit the effective edge 13 of the shovel or the effective edge 27 of the scraper to be optionally disposed in an effectual position.

In Figure 1, the device is shown in condition for carrying out shoveling operations. In Figures 2 and 3, the device is shown in condition for carrying out scraper operations. Adjustment of the elements 10 and 11 is accomplished by grasping the handle section 15 of the shovel element 10 in one hand by the channels 16, and by manipulating the portion 24 with the other hand.

The shovel element 10 and scraper element 11 are held in the different adjusted positions to which they may be moved by friction set up by the channels 16 and tongues 18 on the handle section 21. The stops 23 limit the movement of the elements 10 and 11 to prevent the dislodgment of the piece of rubber 26; it being apparent that a portion of the shovel 12 will always be disposed adjacent the end 19, regardless of the position of the shovel element.

From the foregoing, it will be apparent that there has been described a device consisting of a combined shovel and scraper which may be readily put into condition for optionally carrying out shoveling and scraping operations; and that the device is simple of construction, and one which may be used effectually for the intended purposes.

Having thus described my invention, I claim:

A device of the class described comprising a shovel element, and a scraper element, said shovel element consisting of a shovel body having an effective edge, side flanges, a handle, and tongues, said handle having a channel at each side, said scraper element consisting of an offset portion having prongs, a handle having a manipulating portion connected with said offset portion, and a scraper member embodying an effective edge arranged on said offset portion with the prongs impaling said scraper member, the handle of the scraper element received between the channels and tongues respectively on said shovel body and handle thereof to connect the shovel element and scraper element together for relative movement to optionally dispose the effective edge of the shovel body or scraper member in an effectual position, the scraper element being arranged at the back of the shovel element, and the scraper member being in contact with the shovel body.

HENRY BAMBERGER.